Feb. 24, 1942.  T. B. MODINE  2,274,492
HEATING APPARATUS
Filed Sept. 2, 1938   2 Sheets-Sheet 1
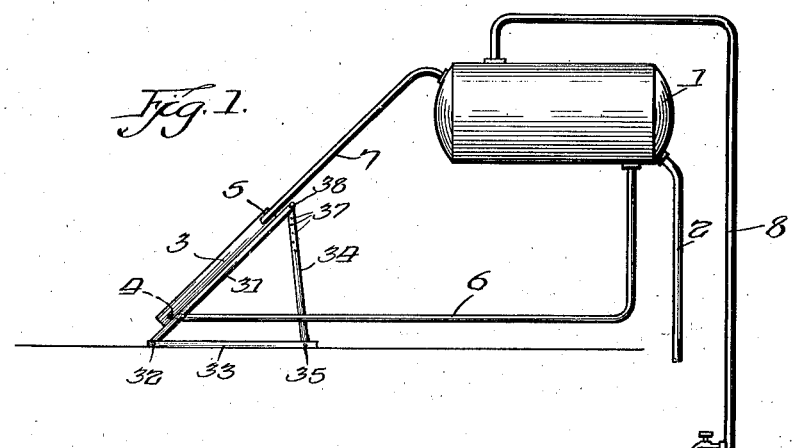
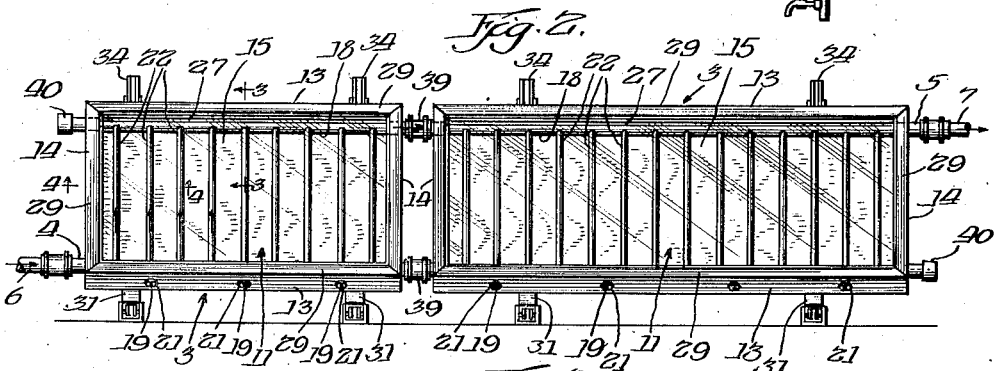
Inventor:
Thomas B. Modine:
By: Hill & Hill Attys.

Feb. 24, 1942.   T. B. MODINE   2,274,492
HEATING APPARATUS
Filed Sept. 2, 1938   2 Sheets-Sheet 2
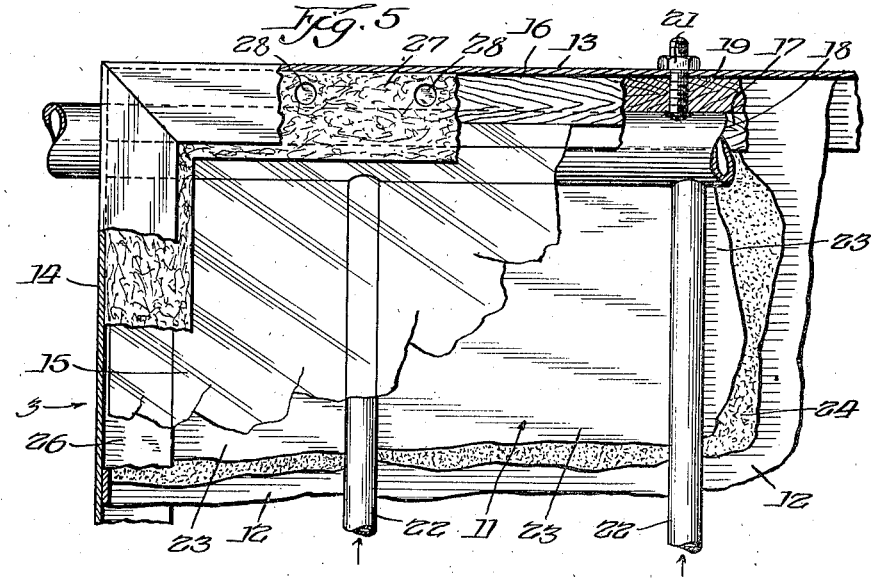
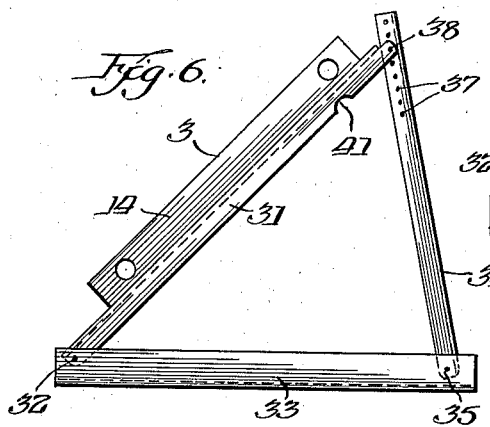
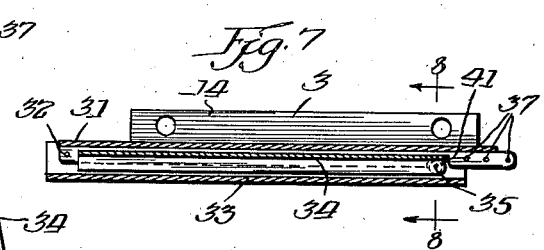
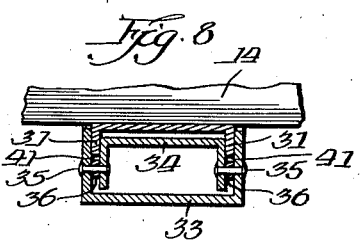
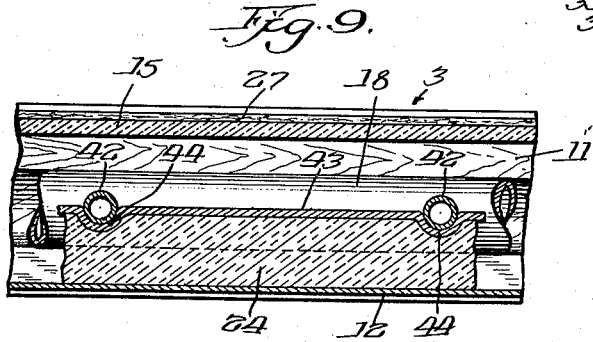
Inventor:
Thomas B. Modine
By Hill & Hill
Attys Patented Feb. 24, 1942

2,274,492

UNITED STATES PATENT OFFICE 2,274,492

HEATING APPARATUS

Thomas B. Modine, St. Petersburg, Fla.

Application September 2, 1938, Serial No. 228,091

2 Claims. (Cl. 126—271)

The invention relates generally to heaters, and more particularly to solar heaters for heating water or other fluids.

The invention has among its objects the production of a heater which derives its heat energy from the sun and which is simple and durable in construction, and efficient for the purposes intended.

Another object of the invention is to construct such a heater in the form of a plurality of units to accommodate installations having varied requirements as to size and capacity.

Another object of the invention is to produce such a heater which is adjustable, allowing the device to be positioned so that it will receive the maximum amount of sunlight and also which may be folded when not in use, and thereby occupy comparatively little space.

Another object of the invention is to produce such a heater having improved circulation and increased thermal action.

Many other objects and advantages of the invention herein shown and described will be obvious to those skilled in the art from the disclosure herein given.

To this end my invention consists in the novel construction, arrangement and combination of parts herein shown and more particularly pointed out in the claims.

In the drawings wherein like reference characters indicate like or corresponding parts:

Fig. 1 represents a partially diagrammatic view of a complete heating system embodying the invention;

Fig. 2 is a front elevational view of the heating elements;

Fig. 3 is a sectional view taken on the line 3—3 of Fig. 2;

Fig. 4 is a sectional view taken on the line 4—4 of Fig. 2;

Fig. 5 is an enlarged fragmentary view of a corner of one of the heating units with the various parts thereof broken away to show the construction of the same;

Fig. 6 is a side elevational view of the device showing the manner in which the heating units are supported;

Fig. 7 is a view similar to Fig. 6, but in section and showing the device with the supporting means in folded position;

Fig. 8 is a sectional view taken on the line 8—8 of Fig. 7; and

Fig. 9 illustrates a slightly modified construction of the device.

Referring to the drawings, and more particularly to Figs. 1 and 2, 1 represents an ordinary water storage tank connected to a suitable supply pipe 2. The heating unit 3 which will hereinafter be described, has an inlet 4 in one end of the device and an outlet 5 at the opposite end, both the inlet and outlet being connected with the tank 1 by suitable piping 6 and 7, respectively, the pipe 6 being connected to the tank adjacent the supply pipe 2 and the pipe 7 at the opposite end of the tank adjacent the delivery pipe 8. The water flows from the supply pipe 2 into the tank 1 and through the pipes 6 and 7 to the heating element 3, thus filling up the system. As the water in the heating element or unit 3 is heated by the sun, it will circulate by convection through the element 3, pipe 7, tank 1 and pipe 6, thus heating the water in the tank 1, and as water is drawn from the delivery pipe 8, more will enter the tank from the supply pipe 2. The pipe 7 preferably enters the tank 1 relatively near the delivery pipe 8 so that heated water may be drawn off before the entire tank of water is heated.

As shown in Figs. 2 to 5, the heating units 3 comprise a sealed chamber 11 formed by the bottom plate 12, side members 13, end members 14 and glass plate 15. Extending along the side members 13 are strips 16 of wood or other suitable material which are hollowed out at 17 to receive the header pipes 18 which are preferably formed of copper or other good heat conductor. The strips 16 serve to insulate the pipes and associated parts from the side members 13. Extending from the headers 18 are suitable studs 19 projecting through the strips 16 and side members 13, the nuts 21 on the studs 19 securely holding the headers 18 in position. Extending from one header to the other are a plurality of smaller cross tubes 22 connecting the two headers and also preferably formed of copper, the relative size of the headers and tubes depending on the capacity desired in the system. The tubes and headers are soldered, brazed, or otherwise suitably secured to form a leakproof construction. To increase the heat absorbing area, and thereby increase the efficiency of the device, fins 23 are provided, the latter being rigidly secured to the headers by soldering, brazing or other suitable means, so that heat absorbed by the fins will be transmitted by conduction to the tubes and the fluid, the fins preferably occupying all available area between the tubes and headers. Likewise, these fins may be formed of separate pieces which are secured to the tubes, as shown in Fig. 4, or may be constructed in the form of a single fin 43, to which the tubes 42 are suitably secured, the latter if desired resting in grooves 44 or the like formed in the fin, as shown in Fig. 9. In either construction the entire exposed interior of the device including the headers, tubes, and fins are preferably painted black to increase the heat absorption thereof. The space between the bottom 12 and the underside of the fins and tubes, etc., is filled with any suitable insulating material 24 to retain the heat in the tubes, etc., and prevent loss of heat through the lower portion of the device. The bottom 12 is attached to the strip 16 by means of screws 25 which pass through the side members 13 and bottom 12 into the strips 16, the portion of the bottom 12 adjacent the ends 14 being bent at a right angle thereto extending along the element 14 for a substantial distance and then back parallel to the bottom, the ends of the glass plate 15 resting on the laterally extending portion 26 and the side edges of the glass resting on the strip 16 which is grooved to receive it. The plate 15 is held in position by a felt strip 27, which extends around the edges thereof, the nail 28 holding the strip 27 in place, while the side and end members 13 and 14, respectively, are formed with laterally extending flange 29 adapted to overlie the strip 27 to provide a workmanlike construction, the members 13 and 14 being secured to one another at their adjacent edges by any suitable means, as for example, by welding or brazing.

Secured to each unit 3 are suitable iron U-beams 31, preferably one beam at each end of a unit. The beams 31 which extend from the unit 3 are pivotally secured at one end, as shown at 32, to a U-shaped base member 33. At the opposite end of the member 33, a similar U-beam 34 is pivoted at 35, the washers 36 maintaining the member in spaced relation. The beam 34 is provided with a plurality of holes 37 adjacent its free end and engages the free end of the beam 31, the same being locked together at 38 by means of a suitable pin extending through the respective holes in the members 31 and 34. As shown in Figs. 7 and 8, the members 31, 33, and 34 are of such respective sizes that the same will nest one within the other, the member 31 being notched at 41 to prevent engagement with the pin 35, and thereby allow the device to be folded when not in use. Likewise, by providing a plurality of holes 37, the unit 3 may be positioned at substantially any desired angle so as to receive the full benefit of the sun.

It will be seen from the above description that I have provided a heating unit which comprises essentially a sealed chamber having a transparent top plate through which the sun's rays may penetrate. Positioned in this chamber are a pair of header pipes connected by a plurality of tubes, with suitable fins secured thereto. The sun's rays pass through the glass plate 25 into the chamber 11 where they strike the fins and tubes, the heat being absorbed in the latter and conducted to the fluid, and thereby utilizing a comparatively large heat absorbing area. Likewise, by means of the holes 37, the device may be positioned at any angle so as to best utilize the sun's rays. The units 3 are preferably made in lengths of five and seven feet, thereby providing various combinations to afford a plurality of various lengths; for example, various combinations of five and seven foot lengths may be joined together to provide the equivalent of a ten, twelve, or fourteen-foot unit.

In operation, the device is placed on the roof or other suitable place and the unit or units set up so as to receive the greatest amount of available sunlight. If two or more units are used, they are connected in series as shown in Fig. 2 by means of suitable connectors 39 joining the ends of the respective header pipes, as many units being connected as is desired to furnish a sufficient supply of hot water. The inlet 4 is connected with the tank 1 and the adjacent end of the opposite outlet header is closed by means of a suitable cap 40 as is the opposite end of the inlet header, the outlet 5 being connected by means of the pipe 7 to the tank 1. Obviously, if two or more units are used, one end of the inlet header and the opposite end of the outlet header are capped regardless of the number of units. As the water in the pipes 18 and connecting tubes 22 is heated, the water will flow upward through the pipe 7 into the tank, cold water entering the inlet 4 by means of the pipe 6. The water will continue to circulate through the unit 3 by convection, thus heating the water in the tank, the cycle being through the pipe 6 and inlet 4 into the inlet header pipe 18, through the tubes 22 into the other header pipe and outlet 5 through the pipe 7 and back into the tank.

It will be seen from the above description that I have provided a means of heating water by utilizing the sun's rays, which is novel in construction, durable and efficient for the purpose intended.

Having thus described my invention, it is obvious that various immaterial modifications may be made in the same without departing from the spirit and scope of my invention; hence, I do not wish to be understood as limiting myself to the exact form, construction, arrangement and combination of parts herein shown and described or uses mentioned.

What I claim as new and desire to secure by Letters Patent is:

1. In a heating device of the kind described, a substantially flat heat transfer element, comprising a pair of substantially parallel inlet and outlet pipes and a plurality of smaller cross-tubes connecting said pipes for the passage of the fluid to be heated from the inlet pipe to the outlet pipe, a plurality of fins extending between and rigidly secured to said cross-tubes, said fins being substantially parallel with the common axial plane of said pipes, a container enclosing said element, consisting of a bottom, a glass top, and side and end members, insulating strips extending along the interior of said side members, each strip having a channel therein adapted to receive one of said pipes, studs extending from said pipes and passing through the respective strips and side members, the latter and said end members having inwardly extending flanges overlying said top and bottom, a felt strip positioned between said glass top and the adjacent flanges, and a layer of heat-insulating material positioned between said heat transfer element and said bottom.

2. In a heating device of the kind described, a substantially flat heat transfer element comprising a pair of substantially parallel inlet and outlet pipes, and a plurality of cross-tubes connecting said pipes for the passage of fluid to be heated from the inlet pipe to the outlet pipe, a plurality of fins extending between and rigidly secured to said cross-tubes, said fins being substantially parallel with the common axial plane of said pipes, a container secured to and enclosing said element, the top side of said container being substantially parallel with the common axial plane of said pipe network and of light-penetrable material, oppositely disposed insulating strips extending along the interior of two opposite side walls of said container, each strip having a channel therein adapted to receive one of said pipes, means extending from said pipes and passing through the respective strips to secure the same thereto whereby said heat transfer element is supported in said container, and a layer of heat insulating material positioned between said heat transfer element and the bottom of said container.

THOMAS B. MODINE.